(12) United States Patent
Yontz

(10) Patent No.: US 10,273,670 B2
(45) Date of Patent: Apr. 30, 2019

(54) SPILL-RESISTANT VACUUM BREAKER VALVE

(71) Applicant: Conbraco Industries, Inc., Matthews, NC (US)

(72) Inventor: Phillip T. Yontz, Rock Hill, SC (US)

(73) Assignee: Conbraco Industries, Inc., Matthews, NC (US)

( * ) Notice: Subject to any disclaimer, the term of this patent is extended or adjusted under 35 U.S.C. 154(b) by 0 days.

(21) Appl. No.: 15/689,262

(22) Filed: Aug. 29, 2017

(65) Prior Publication Data

US 2019/0063051 A1  Feb. 28, 2019

(51) Int. Cl.
| | | |
|---|---|---|
| *E03C 1/10* | (2006.01) | |
| *E03B 7/07* | (2006.01) | |
| *F16K 15/02* | (2006.01) | |
| *F16K 24/04* | (2006.01) | |

(52) U.S. Cl.
CPC .............. *E03C 1/104* (2013.01); *E03B 7/077* (2013.01); *E03C 1/108* (2013.01); *F16K 15/025* (2013.01); *F16K 24/044* (2013.01)

(58) Field of Classification Search
CPC ............... E03C 1/104; Y10T 137/3331; Y10T 137/3099; Y10T 137/7475; F16K 24/052; F16K 24/048

See application file for complete search history.

(56) References Cited

U.S. PATENT DOCUMENTS

| | | | |
|---|---|---|---|
| 4,230,142 A | 10/1980 | Saarem et al. | |
| 5,060,687 A | 10/1991 | Gayton | |
| 5,605,175 A * | 2/1997 | Bergsma | B60K 15/03519 137/202 |
| 5,937,889 A | 8/1999 | Krieg | |
| 5,964,247 A | 10/1999 | Johnson | |
| 6,508,263 B1 * | 1/2003 | Jahnke | B60K 15/03519 137/202 |
| 6,904,931 B2 | 6/2005 | Stephens | |
| 9,453,581 B1 | 9/2016 | Fain | |
| 9,556,965 B2 | 1/2017 | Cardia et al. | |
| 9,580,895 B2 | 2/2017 | Xu et al. | |
| 9,719,235 B1 | 8/2017 | Huang et al. | |
| 9,719,606 B1 | 8/2017 | Yang | |

\* cited by examiner

*Primary Examiner* — Eric Keasel
*Assistant Examiner* — Kevin R Barss
(74) *Attorney, Agent, or Firm* — Shumaker, Loop & Kendrick, LLP

(57) ABSTRACT

A spill-resistant vacuum breaker valve that includes a check assembly positioned in a valve body and is movable between an open position for allowing water to flow into the valve body through the water inlet and out of the valve body through the water outlet, and a closed position for preventing water from flowing out of the valve body through the water outlet. The check assembly cooperates with a float assembly movable by movement of the check assembly between an open position allowing air to enter the valve body through the air inlet and a closed position sealing the valve body against flow of air into the valve body through the air inlet. The float assembly is adapted to pivot sufficiently to level the float and seal against ejection of water from the valve in the event of non-axial movement of the check assembly in the valve body.

15 Claims, 3 Drawing Sheets

SPILL-RESISTANT VACUUM BREAKER VALVE

TECHNICAL FIELD AND BACKGROUND OF THE INVENTION

The present invention relates to a vacuum breaker that includes a feature that enables the breaker to resist spillage of water out of the top of the valve. Vacuum breaker valves are frequently used in environments such as agricultural irrigation areas to prevent back-siphonage of potentially contaminated water into a potable water supply. This prevents contamination, should the potable water system's pressure drop. A vacuum breaker typically contains a check assembly that is pressed forward by water supply pressure and covers small vent holes. Should the supply pressure drop, the check assembly springs back opening the vent holes, which let in outside air and prevent backflow of water.

During normal flow conditions, the check assembly remains open and a float seals onto a bonnet, closing the air inlet. A minimum supply pressure of 10 psi is normally required to fully close the valve. As the line pressure falls to 1 psi, a spring-loaded atmospheric vent valve opens, breaking the vacuum and thereby preventing back-siphonage.

When used in an outdoor environment, vacuum breakers frequently permit a small amount of water to be ejected out of the air inlet during the valve pressurization process, though not once pressurized. However, when the vacuum breaker is installed in a building, for example, to prevent the valve from freezing during cold weather, codes require that no water be ejected from the valve during operation.

In some instances, for example, when the valve is pressurizing slowly, the check assembly may assume a misaligned or "cocked" position relative to the axially-aligned position of the float. This misalignment may occur as a result, of a radial gap between the check assembly and the valve body due to manufacturing tolerances. As the check assembly rises to push the float up to seal the air inlet, the check assembly may maintain its misaligned position, and the float will therefore not fully seal to prevent spillage of water from the air inlet.

There is therefore a need for a simple and reliable spill-resistant vacuum breaker valve that prevents ejection of water from the air inlet during pressurization.

Therefore, it is an object of the invention to provide a spill-resistant vacuum breaker valve that will reliably prevent spillage when the check assembly is not axially-aligned with the flow axis of the valve, and in particular, with the valve float.

It is another object of the invention to provide a spill-resistant vacuum breaker valve that allows the float to freely pivot about the axis of the check assembly in order for the float to level itself to its sealing surface on the valve bonnet and seal even though the check assembly remains out of alignment as it rises.

These and other aspects of the invention are achieved by providing a spill-resistant vacuum breaker valve that includes a valve body having a water inlet, a water outlet; an air inlet and a check assembly positioned in the valve body and movable between an open position for allowing water to flow into the valve body through the water inlet and out of the valve body through the water outlet, and a closed position for preventing water from flowing out of the valve body through the water outlet. The check assembly includes a check poppet, a spring positioned on the check poppet and a spring retainer positioned over and maintaining the spring under compression on the check poppet. The spring retainer includes a co-axial pivot butt.

A float assembly is positioned in the valve body between the check assembly and the air inlet and movable by movement of the check assembly between an open position allowing air to enter the valve body through the air inlet and a closed position sealing the valve body against flow of air into the valve body through the air inlet. The float assembly includes a float adapted to pivot within a predetermined range of motion in relation to a longitudinal flow axis through the valve body. The float assembly has a cavity for receiving the pivot butt and adapted to pivot on the pivot butt. A bonnet is positioned over the float and has a sealing surface. A float seal is carried by the float and is adapted to seal against the sealing surface of the bonnet for preventing passage of water out of the valve body through the air inlet. The pivoting movement of the float is adapted to level the float and the float seal to the sealing surface of the bonnet in response to non-axial movement of the check assembly in the valve body.

According to another aspect of the invention, the float includes a conical float stem and a float spring for resisting movement of the check assembly into a position wherein the float seal seals closed the air inlet.

According to another aspect of the invention, the float spring is adapted to compress into the position where the float seal seals the closed air inlet at a water pressure in the valve of 2 psi.

According to another aspect of the invention, the check spring is adapted to compress into the position where the check assembly allows the water to flow through the valve at a water pressure in the valve of 4 psi.

According to another aspect of the invention, the float spring is adapted to compress into the position where the float seal seals the closed air inlet at a water pressure in the valve of 2 psi and the check spring is adapted to compress into the position where the check assembly moves into a position allowing the water to flow through the valve at a water pressure in the valve of 4 psi.

According to another aspect of the invention, the cavity in the float defines an annular taper, and the pivot butt is shaped to define an annular taper corresponding to the annular taper of the cavity in the float. The pivot butt has a width sufficiently less than a width of the cavity in the float to permit the pivot butt to move pivotally in the cavity of the float to accommodate misalignment of the check assembly in the valve body.

According to another aspect of the invention, the width of the cavity in the float and the width of the pivot butt vary sufficiently to allow radial movement of the pivot butt in the cavity in the float of between 0.5 and 2 degrees.

According to another aspect of the invention, the bonnet includes an annular rib adapted to seal against a top side of the float seal.

According to another aspect of the invention, a spill-resistant vacuum breaker valve is provided that includes comprising a valve body having a water inlet, a water outlet; and an air inlet and a check assembly positioned in the valve body and movable between an open position for allowing water to flow into the valve body through the water inlet and out of the valve body through the water outlet, and a closed position for preventing water from flowing out of the valve body through the water outlet. The check assembly includes a check poppet, a spring positioned on the check poppet and a spring retainer positioned over, and maintaining the spring under compression on the check poppet, the spring retainer including a co-axial pivot butt. A float assembly is positioned in the valve body between the check assembly and the air inlet and movable by movement of the check assembly between an open position allowing air to enter the valve body through the air inlet and a closed position sealing the valve body against flow of air into the valve body through the air inlet. The float assembly includes a float adapted to pivot within a predetermined range of motion in relation to a longitudinal flow axis through the valve body and has a cavity for receiving the pivot butt. The pivot butt is adapted to pivot on the pivot butt, and a bonnet is positioned over the float and has an annular sealing rib. A float seal is carried by the float and is adapted to seal against the sealing surface of the bonnet for preventing passage of water out of the valve body through the air inlet. The float includes a float spring for resisting movement of the check assembly into a position where the float seal seals closed the air inlet. The float spring is adapted to compress into the position where the float seal seals the closed air inlet at a water pressure in the valve of 2 psi and wherein the check spring is adapted to compress into the position where the check assembly moves into a position allowing the water to flow through the valve at a water pressure in the valve of 4 psi. The pivoting movement of the float is adapted to level the float and the float seal to the sealing rib of the bonnet in response to non-axial movement of the check assembly in the valve body.

According to another aspect of the invention, the cavity in the float defines an annular taper, and the pivot butt is shaped to define an annular taper corresponding to the annular taper of the cavity in the float. The pivot butt has a width sufficiently less than a width of the cavity in the float to permit the pivot butt to move pivotally in the cavity of the float to accommodate misalignment of the check assembly in the valve body.

According to another aspect of the invention, the width of the cavity and the width of the pivot butt vary sufficiently to allow radial movement of the pivot butt in the cavity of between 0.5 and 2 degrees.

According to another aspect of the invention, the check assembly includes an annular check guide positioned in the body of the vacuum breaker valve, a check housing, a check poppet, a check spring and a spring retainer mounted for axial movement in the check guide between water flow and non-flow positions.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DETAILED DESCRIPTION OF A PREFERRED EMBODIMENT AND BEST MODE

Figure 1:
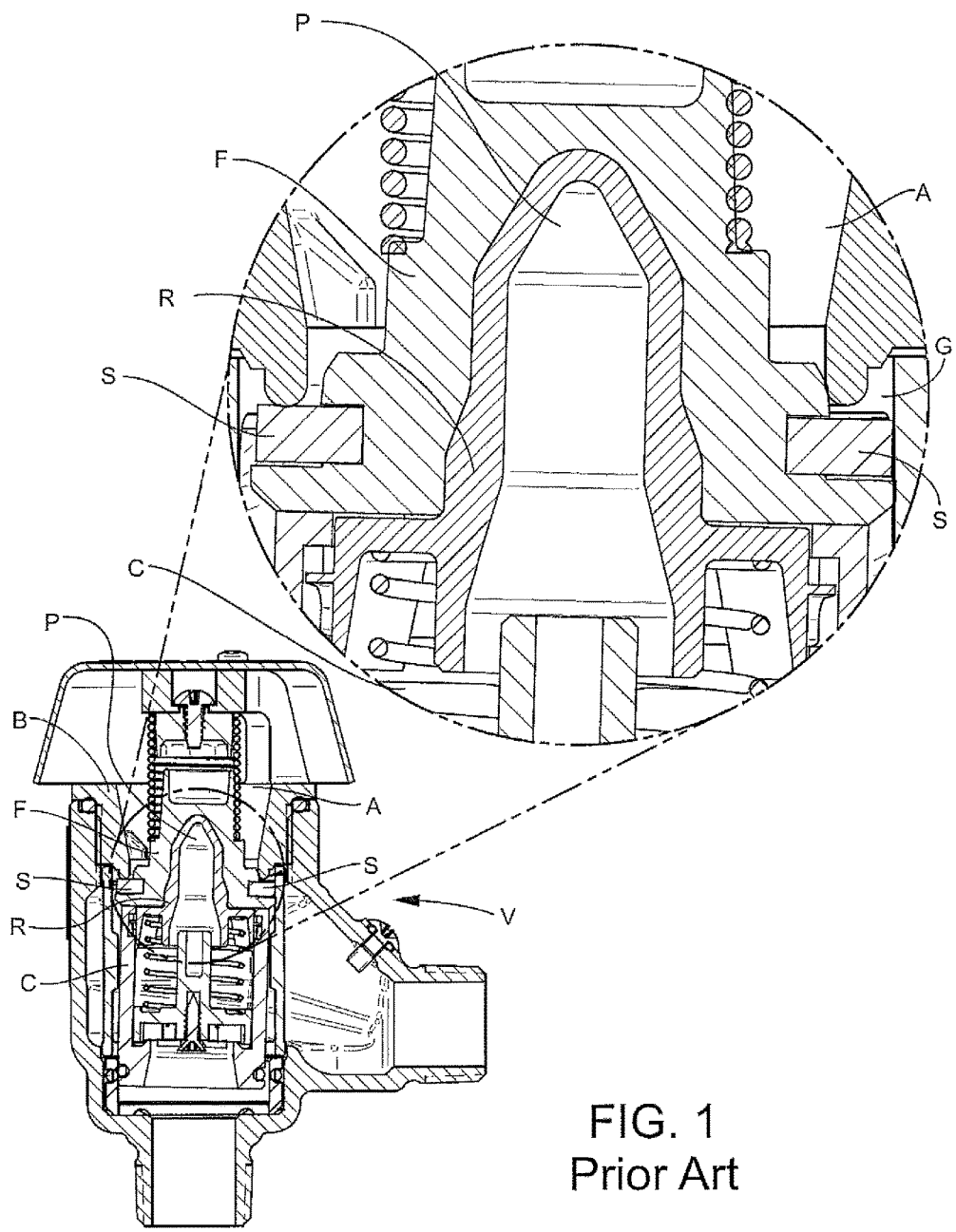
FIG. 1 is a vertical cross-section view of a prior art vacuum breaker, with parts enlarged for clarity.
Figure 2:
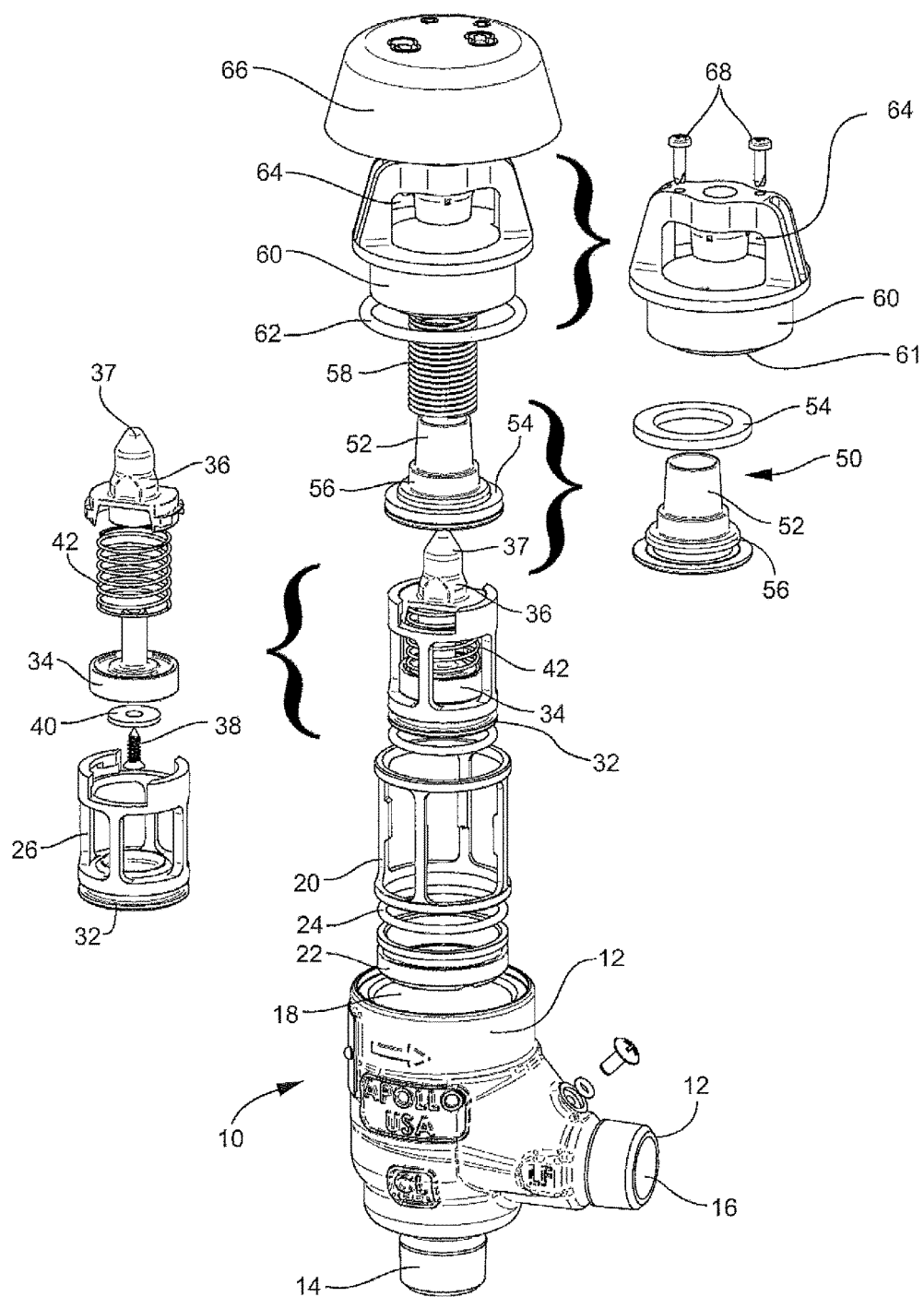
FIG. 2 is an exploded perspective view of a spill-resistant vacuum breaker valve according to a preferred embodiment of the invention.
Figure 3:
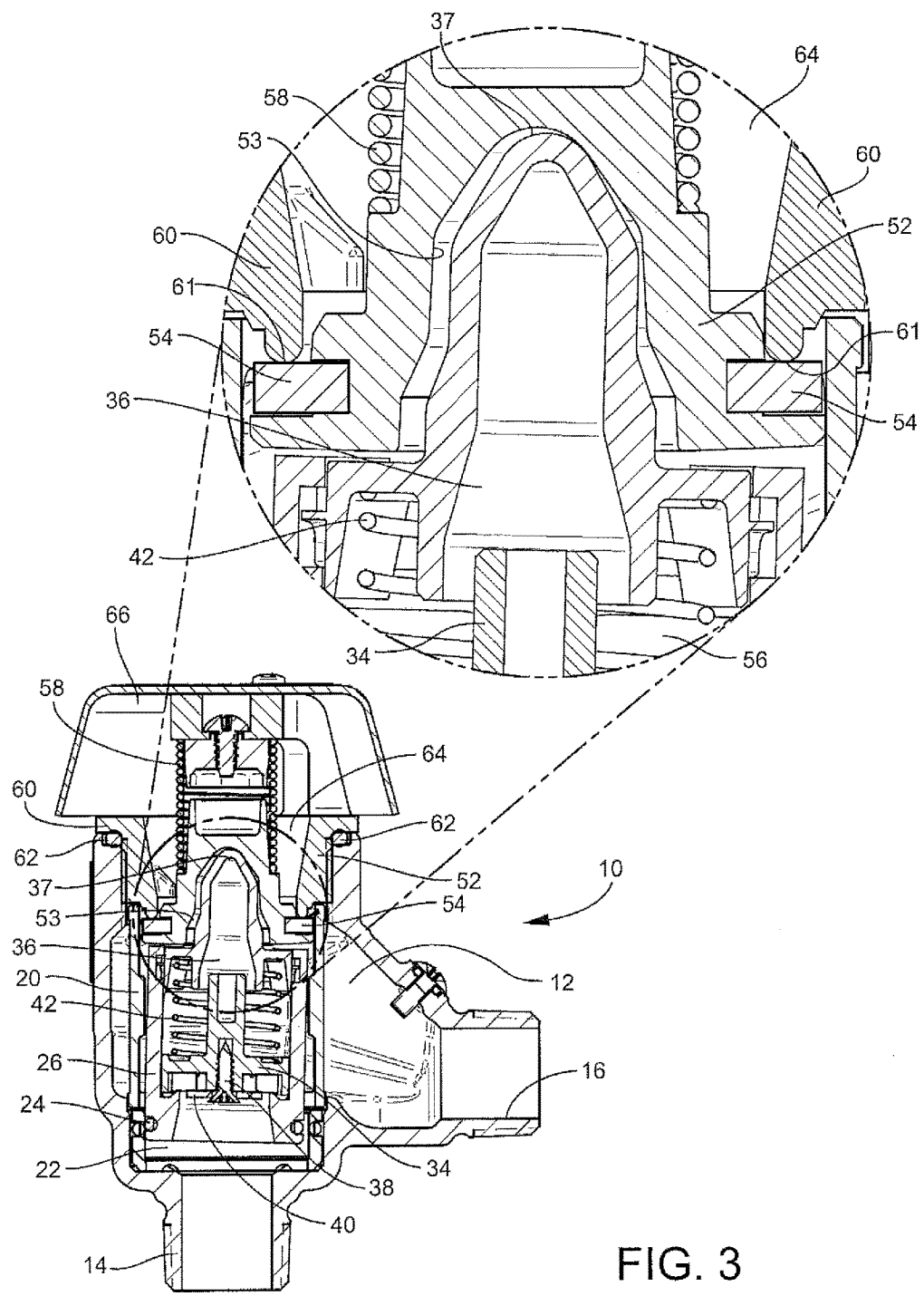
FIG. 3 is a cross-section view of a vacuum breaker according to an embodiment of the invention, with parts enlarged for clarity.

Referring now to the drawings, FIG. 1 illustrates a conventional prior art spill-resistant vacuum breaker valve. Some of the elements of the vacuum breaker valve of FIG. 1 are also present in the novel breaker of FIGS. 2 and 3. Refer to FIGS. 2 and 3 for a full identification of the components.

In FIG. 1, the tolerance between the float "F" and the and the check valve assembly "C" over which it resides is such that the float "F" is allowed to move only in an axial direction without any radial deflection. Thus, if the check valve assembly "C" is not axially-aligned with the flow axis of the valve "V", particularly during a slow pressure rise, the float "F" is forced out of alignment as well, and a gap "G" between the bottom of the bonnet "B" and the float seal "S" can form, allowing water to be ejected under pressure from the air inlet "A" of the vacuum breaker. Note that the float "F" fits tightly around a pivot butt "P" of the check valve assembly "C" and the seal retainer "R".

FIG. 2 illustrates a spill-resistant vacuum breaker valve 10 in accordance with one embodiment of the invention. The valve 10 includes a valve body 12 with a water inlet 14, a water outlet 16 and a check opening 18 for allowing water to flow into the valve body 12 through the water inlet 14 and out of the valve body 12 through the water outlet 16, and a closed position for preventing water from flowing out of the valve body 12 through the water outlet 16. A check guide 20 is mounted in the body 12 on a bushing 22 and sealed with an O-ring 24. A check housing 26 includes a check seat 32 and a check poppet 34 mounted to a spring retainer 36 by a screw 38 and washer 40. A check spring 42 is captured between the check poppet 34 and the spring retainer 36. The check housing 26 is mounted in the check guide 20 and positioned in the body 12 for axial movement relative to the valve body 12 in response to water pressure.

A float assembly 50 includes a float 52, and a float seal 54 that resides on an enlarged shoulder 56 formed near the bottom of the float 52. The bottom of the float 52 rests on the annular top edge of the check housing 26. A float spring 58 fits over the float 52 and is captured between the float 52 and the bonnet 60.

The float spring 58 is adapted to compress into the position where the float seal 54 seals the closed air inlet 64 at a water pressure in the valve body 12 of, for example, 2 psi, and the check spring 42 is adapted to compress into the position where the check assembly 20 moves into a position allowing the water to flow through the valve 10 at a water pressure in the valve of, for example, 4 psi. These values are variable, but the ability of the weaker float spring 58 to close the air inlet 64 at a lower pressure that the ability of the stronger check spring 42 to compress sufficiently to allow water to flow through the valve 10 prevents water from being ejected from the valve 10 through the air inlet 64. The alignment compensating feature described in this application insures that this function operates as intended even when there is misalignment of the check assembly 20 that prevents axial movement of all of the valve components, as intended.

An O-ring 62 seals the bonnet 60 to body 12 at the check opening 18. The bonnet 60 includes a downward-extending annular rib 61 that seals against the top side of the float seal 54. The bonnet 60 also includes air inlets 64 that allow air to enter the valve body 12 and flow past the lower end of the float 52 and through the water outlet 16 to break the vacuum. A protective canopy 66 is mounted to the top of the bonnet 60 by a pair of screws 68.

As shown in FIGS. 2 and 3, the spring retainer 36 defines a pivot butt 37 about which the float 52 is allowed to freely "wobble" within a specified range of motion. This is accomplished by providing in the interior of the float 52 a cavity 53 within which the pivot butt 37 resides as it moves in response to pressure within the valve 10. The interior of the cavity 53 in the float 52 is sufficiently enlarged in relation to the size of the pivot butt 37 so that the float 52 is allowed to pivot on the pivot butt 37 as needed if the check housing 26 is out of axial alignment with the valve body 12. The cavity 53 is annular and tapered, as shown.

By continued reference to FIG. 3, the check housing 26 and pivot butt 37 are shown misaligned in the valve body 12 such that the spring retainer 36 and pivot butt 37 are also misaligned in the cavity 53 in the float 52. Nevertheless, note that because of the ability of the spring retainer 36 and the pivot butt 37 to pivot out of axial alignment with the float 52, the float seal 54 is permitted to be engaged by the bottom of the bonnet 60, sealing the valve 10 against ejection of water through the air inlet 64. The annular rib 61 on the bottom of the bonnet 60 defines an annular, downward projection adapted to seal against the float seal 54.

A gap allows a pivot of the pivot butt 37 in the cavity 53 of the float 52 of between 0.5 to 2 degrees from the nominal flow axis of the valve body 12 is believed sufficient to compensate for an expected misalignment of the check housing 26 and spring retainer 36/pivot butt 37, but the invention is not limited to any specific gap spacing or amount of pivot, since the values are dependent on the size of the valve and the manufacturing tolerances of the valve components, particularly the check assembly 20.

As the valve 10 pressurizes, and if the check housing 26 eventually moves into alignment with the flow axis of the valve 10, the float 52 and float seal 54 pivot in unison with the movement of the check assembly 20, and particularly the pivot butt 37, to maintain the seal.

While the vacuum breaker valve is intended to be used and is most often used in a water supply system, it also may have application in other fluid supply systems, and for that reason, the term "water" is used in a broad sense to refer to any fluid, which may or may not include water as a constituent part, suitable for use with the vacuum breaker valve of this invention.

A vacuum breaker valve is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A spill-resistant vacuum breaker valve, comprising:
   (a) a valve body having a water inlet, a water outlet; and an air inlet;
   (b) a check assembly positioned in the valve body and movable between an open position for allowing water to flow into the valve body through the water inlet and out of the valve body through the water outlet, and a closed position for preventing water from flowing out of the valve body through the water outlet;
   (c) the check assembly including a check poppet, a spring positioned on the check poppet and a spring retainer positioned over and maintaining the spring under compression on the check poppet, the spring retainer including a co-axial pivot butt;
   (d) a float assembly positioned in the valve body between the check assembly and the air inlet and movable by movement of the check assembly between an open position allowing air to enter the valve body through the air inlet and a closed position sealing the valve body against flow of air into the valve body through the air inlet;
   (e) the float assembly including a float adapted to pivot within a predetermined range of motion in relation to a longitudinal flow axis through the valve body and having a cavity therein for receiving the pivot butt and adapted to pivot on the pivot butt, a bonnet positioned over the float and having a sealing surface; and a float seal carried by the float and adapted to seal against the sealing surface of the bonnet for preventing passage of water out of the valve body through the air inlet; and
   (f) the pivoting movement of the float adapted to level the float and the float seal to the sealing surface of the bonnet in response to non-axial movement of the check assembly in the valve body.

2. A spill-resistant vacuum breaker valve according to claim 1, wherein the float includes a conical float stem and a float spring for resisting movement of the check assembly into a position wherein the float seal seals closed the air inlet.

3. A spill-resistant vacuum breaker valve according to claim 2, wherein the float spring is adapted to compress into the position where the float seal seals the closed air inlet at a water pressure in the valve of 2 psi.

4. A spill-resistant vacuum breaker valve according to claim 2, wherein the check spring is adapted to compress into the position where the check assembly allows the water to flow through the valve at a water pressure in the valve of 4 psi.

5. A spill-resistant vacuum breaker valve according to claim 1, wherein the float spring is adapted to compress into the position where the float seal seals the closed air inlet at a water pressure in the valve of 2 psi and wherein the check spring is adapted to compress into the position where the check assembly moves into a position allowing the water to flow through the valve at a water pressure in the valve of 4 psi.

6. A spill-resistant vacuum breaker valve according to claim 1, wherein the cavity in the float defines an annular taper, and the pivot butt is shaped to define an annular taper corresponding to the annular taper of the cavity in the float, the pivot butt having a width sufficiently less than a width of the cavity in the float to permit the pivot butt to move pivotally in the cavity of the float to accommodate misalignment of the check assembly in the valve body.

7. A spill-resistant vacuum breaker valve according to claim 1, wherein the width of the cavity in the float and the width of the pivot butt vary sufficiently to allow radial movement of the pivot butt in the cavity in the float of between 0.5 and 2 degrees.

8. A spill-resistant vacuum breaker valve according to claim 1, wherein the bonnet includes an annular rib adapted to seal against a top side of the float seal.

9. A spill-resistant vacuum breaker valve, comprising:
   (a) a valve body having a water inlet, a water outlet; and an air inlet;
   (b) a check assembly positioned in the valve body and movable between an open position for allowing water to flow into the valve body through the water inlet and out of the valve body through the water outlet, and a closed position for preventing water from flowing out of the valve body through the water outlet;
   (c) the check assembly including a check poppet, a spring positioned on the check poppet and a spring retainer positioned over and maintaining the spring under compression on the check poppet, the spring retainer including a co-axial pivot butt;
   (d) a float assembly positioned in the valve body between the check assembly and the air inlet and movable by movement of the check assembly between an open position allowing air to enter the valve body through the air inlet and a closed position sealing the valve body against flow of air into the valve body through the air inlet;

(e) the float assembly including a float adapted to pivot within a predetermined range of motion in relation to a longitudinal flow axis through the valve body, and having a cavity therein for receiving the pivot butt and adapted to pivot on the pivot butt, a bonnet positioned over the float and having an annular sealing rib; and a float seal carried by the float and adapted to seal against the sealing surface of the bonnet for preventing passage of water out of the valve body through the air inlet;

(f) the float including a float spring for resisting movement of the check assembly into a position wherein the float seal seals closed the air inlet;

(g) the float spring adapted to compress into the position where the float seal seals the closed air inlet at a water pressure in the valve of 2 psi and wherein the check spring is adapted to compress into the position where the check assembly moves into a position allowing the water to flow through the valve at a water pressure in the valve of 4 psi; and (h) the pivoting movement of the float adapted to level the float and the float seal to the sealing rib of the bonnet in response to non-axial movement of the check assembly in the valve body.

10. A spill-resistant vacuum breaker valve according to claim 9, wherein the cavity in the float defines an annular taper, and the pivot butt is shaped to define an annular taper corresponding to the annular taper of the cavity in the float, the pivot butt having a width sufficiently less than a width of the cavity in the float to permit the pivot butt to move pivotally in the cavity of the float to accommodate misalignment of the check assembly in the valve body.

11. A spill-resistant vacuum breaker valve according to claim 10, wherein the width of the cavity in the float and the width of the pivot butt vary sufficiently to allow radial movement of the pivot butt in the cavity in the float of between 0.5 and 2 degrees.

12. A spill-resistant vacuum breaker valve according to claim 10, wherein the check assembly includes an annular check guide positioned in the body of the vacuum breaker valve, a check housing, a check poppet, a check spring and a spring retainer mounted for axial movement in the check guide between water flow and non-flow positions.

13. A spill-resistant vacuum breaker valve, comprising:
(a) a valve body having a water inlet, a water outlet; and an air inlet;
(b) a check assembly positioned in the valve body and movable between an open position for allowing water to flow into the valve body through the water inlet and out of the valve body through the water outlet, and a closed position for preventing water from flowing out of the valve body through the water outlet;
(c) a float assembly positioned in the valve body between the check assembly and the air inlet and movable by movement of the check assembly between an open position allowing air to enter the valve body through the air inlet and a closed position sealing the valve body against flow of air into the valve body through the air inlet;
(d) the float assembly including a float adapted to pivot within a predetermined range of motion in relation to a longitudinal flow axis through the valve body and adapted to seal against a complimentary sealing surface in the valve body for preventing passage of water out of the valve body through the air inlet; and
(e) the pivoting movement of the float adapted to level the float to the sealing surface in response to non-axial movement of the check assembly in the valve body.

14. A spill-resistant vacuum breaker valve according to claim 13, wherein a width of the valve body and a width of the float vary sufficiently to allow pivoting movement of the float in the valve body of between 0.5 and 2 degrees.

15. A spill-resistant vacuum breaker valve according to claim 13, wherein the check assembly includes an annular check guide positioned in the body of the vacuum breaker valve, a check housing, a check poppet, a check spring and a spring retainer mounted for axial movement in the check guide between water flow and non-flow positions.

\* \* \* \* \*